(12) United States Patent
Chesk (10) Patent No.: US 6,938,476 B2
(45) Date of Patent: Sep. 6, 2005

(54) APPARATUS AND METHODS FOR SENSING FLUID LEVELS

(75) Inventor: William G. Chesk, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 150 days.

(21) Appl. No.: 10/603,903

(22) Filed: Jun. 25, 2003

(65) Prior Publication Data

US 2004/0261524 A1 Dec. 30, 2004

(51) Int. Cl.[7] .................. G01F 23/00; G01F 23/24; G01B 21/00
(52) U.S. Cl. .................. 73/290 R; 73/304 R; 340/620
(58) Field of Search .................. 73/304 R, 290 R, 73/304 C; 340/620

(56) References Cited

U.S. PATENT DOCUMENTS

| | | | | |
|---|---|---|---|---|
| 3,694,804 A | * | 9/1972 | Hill | 340/450 |
| 3,905,243 A | * | 9/1975 | Goldfuss | 73/295 |
| 4,027,172 A | * | 5/1977 | Hamelink | 307/118 |
| 4,628,302 A | * | 12/1986 | Barr et al. | 340/620 |
| 4,903,530 A | * | 2/1990 | Hull | 73/304 R |
| 5,226,313 A | * | 7/1993 | Murata et al. | 73/149 |
| 5,255,021 A | * | 10/1993 | Noguchi et al. | 347/19 |
| 5,775,164 A | * | 7/1998 | Kishi | 73/304 R |
| 6,362,632 B1 | * | 3/2002 | Livingston | 324/661 |
| 6,571,625 B2 | * | 6/2003 | Thomson | 73/304 C |
| 6,764,153 B2 | * | 7/2004 | Tanaka | 347/10 |

OTHER PUBLICATIONS http://www.deltacnt.com/512.htm.

* cited by examiner

*Primary Examiner*—Hezron Williams
*Assistant Examiner*—Katina Wilson (57) ABSTRACT

Devices and methods are disclosed for sensing the level of a fluid in a reservoir. The device comprises a generator for generating symmetrical pulses of electric potential, a ground generator in communication with the above generator, means for sensing resistance, and a latch circuit in communication with the above means for sensing resistance. In a method of the invention, a first electric potential is applied to an electrode within the reservoir. The first electric potential has a predetermined value and duration. The resistance of fluid within the reservoir is measured during application of the first electric potential. A second electric potential is applied to the electrode after the measurement for a period of time substantially equivalent to the duration of the first electric potential and of a value substantially equivalent to and opposite to the predetermined value of the first electric potential.

11 Claims, 3 Drawing Sheets

FIG. 7

APPARATUS AND METHODS FOR SENSING FLUID LEVELS

BACKGROUND OF THE INVENTION

This invention relates generally to sensing the level of fluids in a reservoir. More particularly, the present invention relates to sensing fluid levels in reservoirs that are part of fluid dispensing apparatus used in the manufacture of substrates or supports having bound to the surfaces thereof a plurality of chemical compounds, such as biopolymers.

Many devices are known that operate to monitor fluid level in vessels or reservoirs such as tanks, storage containers and the like. Many devices operate by means of an electromechanical switch that is activated by a float. The float rides or floats on the surface of the fluid. When the fluid reaches a given level, a switch coupled to the float is operated.

There are other systems that utilize electrical or electronic devices to detect the level of fluid in a vessel or reservoir. For example, fluid level controls for containers such as boilers are known. Conductance probe controls detect a level of a conductive media, such as a fluid, by passing an electrical current through a probe, into the conductive media and then back to a controller. The probe is at least partially immersed in the fluid when the fluid is at certain levels and not in contact with the fluid when the fluid is at lower levels. The controller measures the received current level to determine whether the probe is in contact with the media, i.e., whether a fluid is at or above a certain level. As fluid engulfs the electrode, electrical conductivity between the electrode and the reservoir body is increased. This increase is detected electronically and a digital signal is produced indicating the presence or absence of fluid.

Such devices conventionally utilize AC currents, as applying a constant DC current to a probe exposed to a conductive fluid can undesirably promote probe deterioration. However, a drawback of using AC is that it requires the inclusion of support circuitry when also using a conventional microcontroller. This increases the cost and complexity of such a device. Three examples of commercially available sensors using AC currents can be found at these websites:
http://www.measure.com/sensors/sensor-soil.htm (see "Introduction"),
http://www.deltacnt.com/512.htm (see "Features" and "Operating Principle"),
http://www.gemssensors.com/operatingCLS1200.htm (See "Operating Principle" and comparison chart.)

A device for sensing a level of a fluid is disclosed in U.S. patent application Publication 2002/0189346 A1 (Thomson) published Dec. 19, 2002, filed Jun. 6, 2001. The device of Thomson includes a microcontroller, a probe coupled to the microcontroller, and a plurality of instructions for use by the microcontroller to apply a given DC potential to the probe for a first period of time, measure a voltage associated with the level of the fluid to be sensed after the first period of time, and apply a reference DC potential to the probe for a second period of time.

There remains a need for a device for sensing fluid levels in a fluid storage vessel. The device should avoid AC sources and promote safety by limiting probe excitation to safe levels. The device should be compact and comprise a minimum number of components so that they may be employed in compact locations. It is also desirable to have methods and apparatus for avoiding damage to the sensing probe. The methods and apparatus should be particularly applicable to droplet dispensing devices for preparing a plurality of chemical compounds on a surface of a substrate to form a plurality of features such as, for example, an array of features on the substrate.

SUMMARY OF THE INVENTION

One embodiment of the present invention is a device for sensing the level of a fluid in a reservoir. The device comprises a generator for generating symmetrical pulses of electric potential, a ground generator in communication with the above generator, means for sensing resistance, and a latch circuit in communication with the above means for sensing resistance. In one embodiment the means for sensing resistance comprises a probe for placing in the reservoir. In another embodiment the means for sensing resistance comprises a resistance amplifier. In another embodiment the generator for generating a symmetrical pulse of electric potential is a switching circuit.

Another embodiment of the present invention is a device for sensing the level of a fluid in a reservoir. The device comprises a switching circuit, a ground generator in communication with the switching circuit, a resistance amplifier in communication with the switching circuit, a latch circuit in communication with the resistance amplifier and an electrode in communication with the resistance amplifier.

Another embodiment of the present invention is a device for sensing the level of a fluid in a reservoir. The device comprises means for applying a first electric potential of predetermined value to the fluid within the reservoir for a predetermined duration, means for measuring the effect of the fluid on the first electric potential, and means for applying to the fluid a second electric potential for a period of time substantially equivalent to the predetermined duration of the first electric potential and at a value substantially equivalent to and opposite to the predetermined value of the first electric potential.

Another embodiment of the present invention is a method for sensing the level of a fluid in a reservoir. A first electric potential is applied to an electrode within the reservoir. The first electric potential has a predetermined value and duration. The resistance of fluid within the reservoir is measured during application of the first electric potential. A second electric potential is applied to the electrode after the measurement for a period of time substantially equivalent to the duration of the first electric potential and of a value substantially equivalent to and opposite to the predetermined value of the first electric potential. In one embodiment a switching circuit is employed in applying the first and second electric potentials. In another embodiment a ground generator is employed in applying the first and second electric potentials. In another embodiment a sense circuit is employed in measuring the resistance in step (b). In another embodiment an electrode placed in the reservoir is employed in measuring the resistance in step (b). In another embodiment a latch circuit is employed in measuring the resistance in step (b).

Another embodiment of the present invention is a fluid dispensing apparatus comprising a plurality of reservoirs, a droplet dispensing device comprising a plurality of droplet dispensers, each in fluid communication with a respective reservoir, and a plurality of fluid level sensors, one for each of the reservoirs. Each of the fluid level sensors is a device as described above.

Another embodiment of the present invention is an apparatus for synthesizing an array of biopolymers on the surface of a support. The apparatus comprises a plurality of reservoirs for containing reagents for synthesizing the biopolymers, a droplet dispensing device comprising a plurality of droplet dispensers, each in fluid communication with a respective reservoir, a plurality of fluid level sensors, one for each of the reservoirs, wherein each of the fluid level sensors is a device as described above, and a mechanism for moving a substrate with respect to the droplet dispensing device.

Another embodiment of the present invention is a method for synthesizing an array of biopolymers on a surface of a substrate. One or more polymer subunits are added, in multiple rounds of subunit additions, at each of multiple feature locations on the surface to form one or more arrays on the surface. Each round of subunit additions comprises bringing the substrate and a dispensing system for dispensing the polymer subunits for the synthesis of the biopolymers into a dispensing position relative to the activated discrete sites on the surface. The dispensing system comprises a plurality of reservoirs and a droplet dispensing device comprising a plurality of droplet dispensers. Each of the dispensers is in fluid communication with a respective reservoir. The polymer subunits are dispensed to the discrete sites. The substrate and/or the dispensing system are removed from the relative dispensing position, and the above steps are repeated. In the above method, the level of liquid reagent in each of the reservoirs is sensed at predetermined intervals by applying a first electric potential to an electrode within the reservoir where the first electric potential has a predetermined value and duration. The resistance of the liquid reagent within the reservoir is measured during application of the first electric potential. A second electric potential is applied to the electrode after the measurement for a period of time substantially equivalent to the duration of the first electric potential and of a value substantially equivalent to and opposite to the predetermined value of the first electric potential.

Another embodiment of the present invention is a method for synthesizing an array of biopolymers on a surface of a substrate. One or more polymer subunits are added, in multiple rounds of subunit additions, at each of multiple feature locations on the surface to form one or more arrays on the surface. Each round of subunit additions comprises bringing the substrate and a dispensing system for dispensing the polymer subunits for the synthesis of the biopolymers into a dispensing position relative to the activated discrete sites on the surface. The dispensing system comprises a plurality of reservoirs and a droplet dispensing device comprising a plurality of droplet dispensers. Each of the dispensers is in fluid communication with a respective reservoir. The polymer subunits are dispensed to the discrete sites. The substrate and/or the dispensing system are removed from the relative dispensing position, and the above steps are repeated. In the above method, the level of liquid reagent in each of the reservoirs is sensed at predetermined intervals by a method comprising applying a symmetrical pulse of electric potential to an electrode within the reservoir. The symmetrical pulse comprises first and second electric potentials of equal intensity and duration but opposite value. The resistance of the liquid reagent within the reservoir is measured only during application of the first electric potential.

DETAILED DESCRIPTION OF SPECIFIC EMBODIMENTS OF THE INVENTION

The present methods and devices provide for sensing fluid levels in a reservoir without the use of AC source potential. Solution electrolysis is minimized or avoided due to low duty of applied electrode voltage. The present devices and methods sense megohms using low valued resistors and common op-amp. The design of the present devices yields symmetrical DC pulses. One switching circuit can run several sense circuits (multiple sensors). Overall, the present devices are compact in size and are ideal for miniaturization. In the present methods and devices, conductivity is detected on a sampled basis. A switching circuit is used to provide alternating positive and negative DC sample pulses to momentarily sense conductivity between the electrode and the body of the reservoir. A low duty cycle is used to minimize electrode activation time. The alternating pulses prevent any DC bias effects of the sensed fluid. An electronic ground generator ensures the alternating pulses are equal in amplitude so that no net DC appears at the electrode. In this way a self-adjusting system is realized requiring little or no changes once the circuit is in place.

The aforementioned approach differs substantively from the AC method discussed above. The present invention accomplishes the null effect of the AC method using low duty-cycle, bipolar DC pulses. In the AC method, the voltage appearing at the electrode is a sine wave, where a net voltage appears during the whole cycle, except at the positive-negative crossing points of the waveform where the voltage is zero. In the present invention involving a pulse scheme, voltage is applied only during the pulses and not during the time between pulses. This is a significant difference. In one example of the present invention, a 3 millisecond positive pulse, 500 millisecond off time, 3 millisecond negative pulse and another 500 millisecond off time is employed. This amounts to a net voltage being applied to the electrode for only 6 milliseconds out of 1006 milliseconds, which is less than 1% of the cycle time. The aforementioned example is by way of illustration and not limitation and the claims should not be construed solely in light of this exemplary embodiment.

As mentioned above, one embodiment of the present invention is a device that comprises means for applying a first electric potential of predetermined value to the fluid within the reservoir for a predetermined duration, means for measuring the effect of the fluid on the first electric potential, and means for applying to the fluid a second electric potential for a period of time substantially equivalent to the predetermined duration of the first electric potential and at a value substantially equivalent to and opposite to the predetermined value of the first electric potential.

The term "reservoir" is meant to include any container for containing fluids such as liquid reagents. The containers may be open or closed and may comprise one or more ports or orifices such as inlets, outlets and the like.

The phrase "substantially equivalent" means that two items, such as, e.g., duration of application of electric potential at two different instances are sufficiently close in value so as to avoid deleterious effects of DC potential on a probe such as an electrode. As an example for purposes of illustration, one can compare the application of voltage (electric potential) at two different times. The first time is the application of a positive voltage and the second time is the application of an equivalent negative voltage. In this example, "substantially equivalent" refers to how close the two values are in magnitude. It may be that the effect can be equated to total power dissipated in the fluid provided that there is an easy way to specify or measure such total power. The above may be view as a net zero DC bias to the electrode over (a specified) time. Preferably, two items in question are equivalent in value so as to avoid fully any deleterious effects on a probe. However, the two items may vary by up to about 2%, by up to about 1%. For example, the two items may vary up to about 2%, up to about 1%, in voltage magnitude and duration.

The phrase "applying an electric potential" means directing an electrical potential to a probe to produce a difference in electrical potential between the probe and the means for measuring the effect of the fluid on the electric potential. Usually, electric potential is applied by application of voltage to the probe. The above phrase includes the maintaining of one of the elements at ground and direction of electrical potential to the other element to produce a difference in electrical potential.

The means for measuring the effect of the fluid on the first electric potential may be means for measuring conductance or resistance, which is the reciprocal of conductance. One such means is a resistance sense block or a circuit that senses the resistance of a fluid in the reservoir. The resistance sense block comprises an operational amplifier or op-amp utilizing both positive and negative feedback to implement the equivalent of an 'amplified resistor'. This technique provides for measuring resistances in the range of millions of ohms (Megohm range) while the circuit itself is composed of discrete resistors with values much less than that, i.e., in the range of thousands of ohms (Kilohm range). This approach provides a repeatable and robust circuit in that it is inherently more immune to environmental influences, such as humidity or chemical vapors, which would affect higher impedance circuits using Megohm resistors.

The positive and negative feedback are determined strictly by the connection topology of discrete resistors with the operational amplifier (op-amp). This may be explained more fully as follows: Positive feedback is used with an operational amplifier to provide a "resistance amplification" effect, i.e., the input resistance of the circuit is effectively increased (amplified) via the regenerative action of the amplifier. The servo effect of positive feedback through an operational amplifier controlled network effectively increases the input impedance of the network. Negative feedback is used to provide stability of circuit operation. The relative value of negative to positive feedback is slightly greater than one to ensure the above. By making this ratio close to one, bootstrapped circuit operation is achieved without circuit oscillation.

The means for applying a first electric potential and the means for applying a second electric potential may be a combined means in the form of a symmetrical pulse generator. While the resistor sense circuit measures fluid resistance at a probe such as a sense electrode, this is not done continuously. The symmetrical pulse generator provides a means of gating both positive and negative voltages of equal amplitude to provide momentary but regular resistance sensing of the electrode. In one embodiment the symmetrical pulse generator provides a positive voltage pulse to the electrode for a short time interval (on the order of milliseconds) during which the resistance sensor makes its measurement. The value of the positive pulse voltage is about 1 to about 5 volts and the duration of the positive pulse voltage is about 1 to about 5 milliseconds, usually, about 1 to about 3 milliseconds. After the pulse is removed, there is a period of several hundred milliseconds, usually, about 400 to about 500 milliseconds, where no voltage is applied to the electrode. The pulse generator then applies a negative voltage pulse to the electrode for the same short time interval that the positive pulse was applied and equal in amplitude to the positive pulse. Preferably, it is the same short time interval and equal amplitude. However, variation of up to about 2%, up to about 1%, may be tolerated. The pulse is then removed and a delay of several hundred milliseconds, usually, about 400 to about 500 milliseconds, occurs until the reapplication of the positive voltage pulse, and the process repeats. The aforementioned process may be repeated at a frequency of about 250 Hz to about 5 millisecond, usually, about 0.5 to about 3 milliseconds. It is, of course, within the scope of the invention to reverse the polarity of the applied voltages as long as the duration and amplitude of the applied voltages is substantially equivalent.

The aforementioned procedure has the effect of presenting a net zero DC bias to the electrode over time. For purposes of convenience, the total time period is about 1 second to about 1.5 seconds. However, this is not critical since there is no inherent restriction in the design. A 1 second interval, for example, is a convenient interval chosen for updating the sensor indication. Generating pulses that are equal in duration and equal but opposite in amplitude results in an 'AC-type' operation without the support circuitry needed by conventional AC operated sensing circuits. This approach allows significant miniaturization of the circuit over that of standard AC sensing schemes. In addition, the low duty cycle of the sensing pulses provides less electrical energizing of the electrode than a conventional AC scheme, producing further reduced electrical effect on the electrode and sensed fluid.

The size of the present devices for sensing fluid levels in a reservoir is about 200 to about 700 $mm^2$, usually, about 300 to about 600 $mm^2$, more usually, about 400 to about 500 $mm^2$. Thus, a plurality of the present devices may be employed in a small area. When one considers that in the above example there are ten independent sensors in this area, the design is compact compared to general purpose schemes. Of course, the number of devices is dependent on the size of the individual devices as well as the size of the area. Typically, for a device of the invention that is about 450 $mm^2$, about 10 to about 14 devices may be employed in an area of about 4500 $mm^2$ to about 6300 $mm^2$.

In one exemplary embodiment of the present invention, generation of symmetrical pulses is achieved by charging and discharging a single capacitor over a tightly controlled voltage range. Using the same capacitor for generating both pulses ensures equal pulse widths. In one approach, the voltage range is set as equal positive and negative power supply voltages by generating a ground that is exactly half way between the two voltages. Means for generating the aforementioned ground may be, for example, a ground generator that is implemented using a precision resistor divider and an operational amplifier buffered by two bipolar transistors to provide the midway ground potential. This technique eliminates the need for exact voltage settings for a power supply and makes the precision of the pulse generator circuit inherent without any external adjustment during circuit manufacture. It also eliminates the need for periodic calibration.

In one embodiment of the invention, a latch circuit is used to freeze the state of the resistance sensor output during the measuring pulse. This circuit determines if the resistance circuit is sensing a fluid or not and generates a "fluid present" or "fluid not present" binary signal for reading by a remote monitor such as a computer. In one approach, the latch circuit is implemented with an operational amplifier and FET transistor and some resistors connected to provide a gated threshold detector and isolated status signal for reading by a remote computer. This simple scheme provides a conventional latch function using a minimum of components, thus furthering miniaturization the sensing circuit. The remote monitor causes a display to indicate the 'fluid present' or 'fluid absent' condition. The display may be, for example, an LED, incandescent light, industrial controller readout, computer screen graphic interface or the like.

It is important to note that a microcontroller is not required to conduct the present method. Accordingly, the generation of symmetrical pulses with sensing occurring during the positive pulse and no electrical energizing of a probe between pulses or during the negative pulse is accomplished by discrete resistors, transistors, operational amplifiers under slave control of a low-frequency oscillator. Furthermore, the present invention does not require, nor does it use, a reference potential such as a DC reference potential. Thus, the present invention is substantively and substantially different from that of Thomson discussed above.

As mentioned above, the probe may be an electrode that is placed in the interior or chamber of the reservoir. Such electrodes are well known in the art. The probe has a suitable shape such as, for example, rod, pin, cone, and so forth. The electrodes may be fabricated from a suitable material that is inert to the fluid reagents and that withstands the application of voltages in the presence and absence of fluid reagent in the reservoir. Such materials include inert metals such as gold, platinum, stainless steel and so forth. Other types of probes that may be employed include any material that does not allow fluid to collect on a surface, i.e., non-wetting probes and the like.

Figure 1:
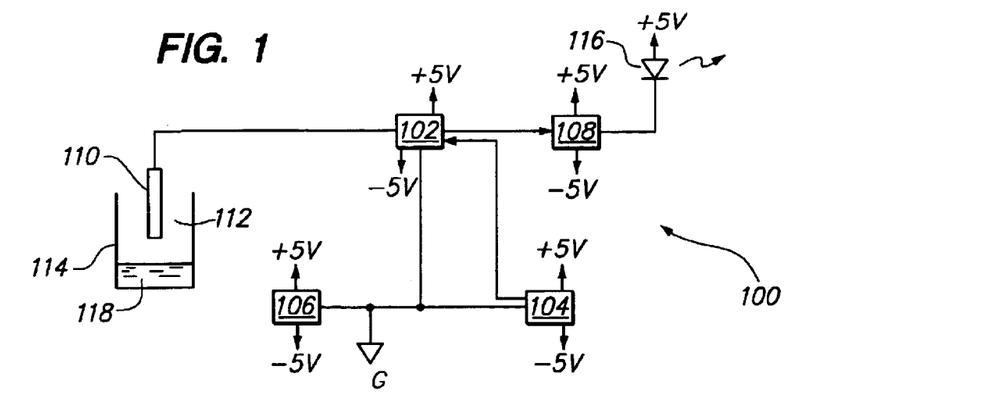
FIG. 1 is a diagrammatic sketch of one embodiment of the present invention showing an electrical circuit for a device in accordance with the present invention.

A specific embodiment of the present invention is depicted in FIG. 1. Device 100 is depicted and comprises sense circuit 102, switching circuit 104, ground generator 106, and latch circuit 108. Sense circuit 102 is in communication with electrode 110 within chamber 112 of reservoir 114. Sense circuit 102 is also in communication with switching circuit 104, ground generator 106 and latch circuit 108. LED 116 is in communication with latch circuit 108. Communication between the various circuits is achieved using appropriate wiring, circuit traces, and so forth.

The operation of device 100 to sense the level of fluid 118 in chamber 112 is described next with reference to FIG. 1. Switching circuit 104 is activated by means of a 555 timer controlling a switching FET to apply a positive voltage of +5V to sense circuit 102 and electrode 110 for a period of 3 milliseconds. During this period, resistance is measured at electrode 110 by sense circuit 102. Latch circuit 108 communicates the measured resistance to LED 116. When fluid is not sensed by electrode 110, resistance measured is high and, in the embodiment shown, LED 116 indicates this condition by being "off." This condition, in turn, is communicated to a valve (not shown), which opens and allows fluid to enter chamber 112. Device 110 continues to operate in accordance with the present methods. Thus, after the application of the positive voltage for the aforementioned period of time, a relaxation period of 500 milliseconds is conducted and then switching circuit 104 is activated to apply a negative voltage of −5V to sense circuit 102 and electrode 110 for a period of 3 milliseconds, which is equivalent to the period of application of the positive voltage above. After the application of the negative voltage for the aforementioned period of time, a relaxation period of 500 milliseconds is conducted. The above process is repeated at a frequency of 1006 milliseconds. When fluid is sensed by electrode 110, resistance measured is low and, in the embodiment shown, LED 116 indicates this condition by being "on." In this exemplary embodiment measurement of resistance is carried out only during the application of the positive voltage.

The devices of the present invention may also be equipped to provide readout of the level of fluid in a reservoir. This may be accomplished as follows: Electrodes are placed at discrete intervals along the vertical axis of the reservoir. Each electrode is connected to a sense circuit with its individual display such as, for example, LED. As fluid rises in the reservoir, successive sensors detect the fluid and light its associated LED. The level of fluid can be determined by viewing which LED's are lit. The LED's should be arranged in a similar geometry such as, for example, a vertical line, for best intuitive level indication. In addition, the devices of the invention may also comprise an alarm to alert the user that a reservoir is low in fluid level and/or that a fluid is being added to the reservoir. Suitable alarms are well known in the art.

Figure 2:
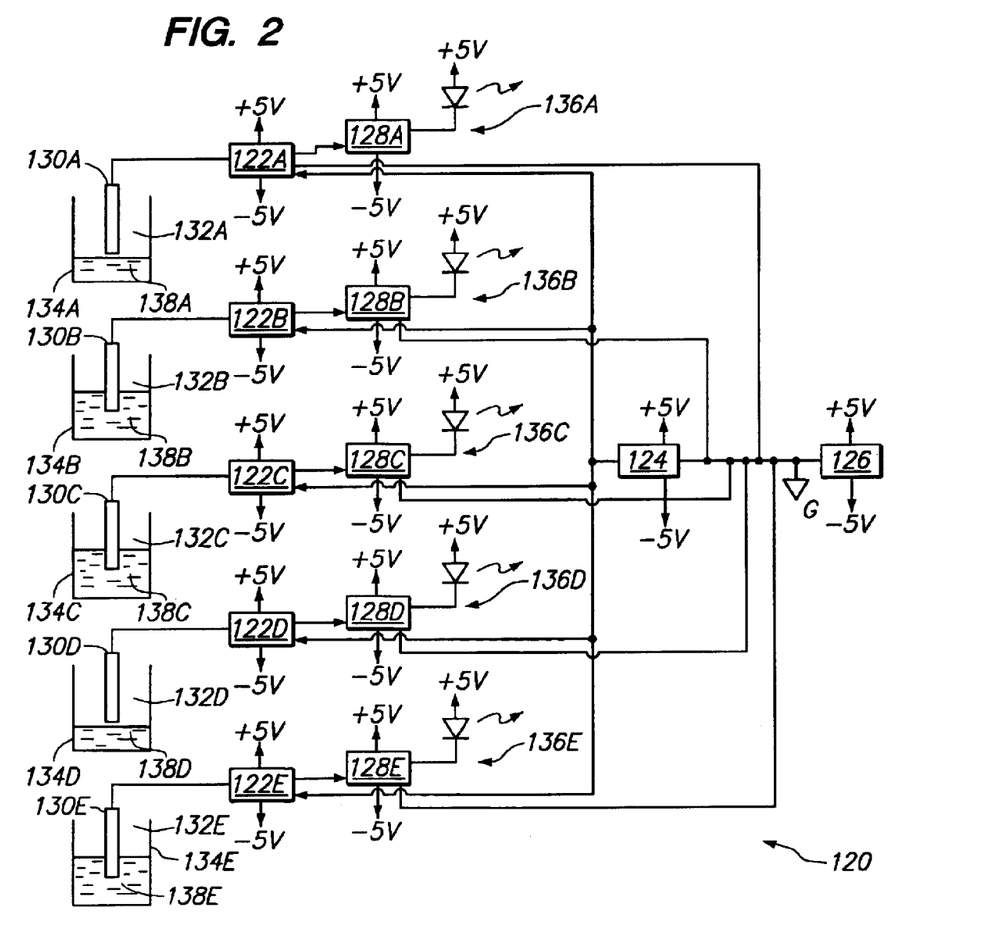
FIG. 2 is a diagrammatic sketch of another embodiment of the present invention showing an electrical circuit for a device in accordance with the present invention.

Another specific embodiment of the present invention is depicted in FIG. 2. Device 120 is depicted and comprises multiple sense circuits 122a–122e, switching circuit 124, ground generator 126, and latch circuits 128a–128e. Sense circuits 122a–122e are respectively in communication with electrodes 130a–130e within chamber 132a–132e of reservoirs 134a–134e. Each of sense circuits 122a–122e is also in communication with switching circuit 124, ground generator 126 and a respective latch circuit 128a–128e. LED's 136a–136e are in communication with respective latch circuits 128a–128e.

The operation of device 120 to sense the level of fluid 138a–138e in chambers 132a–132e is described next with reference to FIG. 2. Switching circuit 124 is activated to apply a positive voltage of +5V, respectively, to sense circuits 122a–122e and electrodes 130a–130e for a period of 3 milliseconds. During this period, resistance is measured at electrode 130a–130e by respective sense circuits 122a–122e. Latch circuits 128a–128e communicates the respective measured resistance to LED's 136a–136e, respectively. When fluid is not sensed by an electrode such as with electrodes 130a and 130d, respectively, of reservoirs 134a and 134d, resistance measured is high and, in the embodiment shown, LED's 136a and 136d indicates this condition by being "off." This condition, in turn, is communicated to a valve (not shown), which opens and allows fluid to enter respective chambers 132a and 132d. When fluid is sensed by an electrode such as with electrodes 130b, 130c and 130e, respectively, of reservoirs 134b, 134c and 134e, resistance measured is low and, in the embodiment shown, LED's 136b, 136c and 136e indicate this condition by being "on." This condition, in turn, is communicated to a valve (not shown), which opens and allows fluid to enter respective chambers 132b, 132c and 132e. Device 110 continues to operate in accordance with the present methods. After the application of the positive voltage for the aforementioned period of time, a relaxation period of 500 milliseconds is conducted and then switching circuit 124 is activated to apply a negative voltage of −5V to sense circuits 122a–122e and electrodes 120a–120e for a period of 3 milliseconds, which is equivalent to the period of application of the positive voltage above. After the application of the negative voltage for the aforementioned period of time, a relaxation period of 500 milliseconds is conducted. The above process is repeated at a frequency of 1006 milliseconds. As in the embodiment of FIG. 1, measurement of resistance in this exemplary embodiment is carried out only during the application of the positive voltage.

Another embodiment of the present invention is a fluid dispensing apparatus comprising a plurality of reservoirs, one or more droplet dispensing devices each comprising a plurality of droplet dispensers and each in fluid communication with a respective reservoir, and a plurality of fluid level sensors, one for each of the reservoirs. Each of the fluid level sensors is a device as described above.

The fluid dispensing apparatus may include a reagent source or manifold for adding fluids to respective reservoirs as well as reagent lines that connect the reservoirs to the reagent sources and to fluid dispensing nozzles and the like. The droplet dispensing devices may be any system that dispenses fluids such as water, aqueous media, organic solvents, liquid reagents and the like as droplets of liquid. The fluid dispensing apparatus may comprise a pump for moving fluid and usually does comprise a valve assembly and a manifold. The droplet dispensing device includes means for delivering predetermined quantities of fluid to the surface of a substrate. Such means include, for example, fluid dispensing nozzles and the like. The fluids may be dispensed by any of the known techniques. Any standard pumping technique for pumping fluids may be employed in the fluid dispensing apparatus. For example, pumping may be by means of a peristaltic pump, a pressurized fluid bed, a positive displacement pump, e.g., a syringe pump, and the like In one specific embodiment a droplet dispensing device comprises one or more droplet dispensers or heads, which may be of a type commonly used in an ink jet type of printer. Each head carries hundreds of ejectors or nozzles to deposit droplets. In the case of heads, each ejector may be in the form of an electrical resistor operating as a heating element under control of a processor (although piezoelectric elements could be used instead). Each orifice with its associated ejector and a reservoir chamber, acts as a corresponding pulse jet with the orifice acting as a nozzle. In this manner, application of a single electric pulse to an ejector causes a droplet to be dispensed from a corresponding orifice (or larger droplets could be deposited by using multiple pulses to deposit a series of smaller droplets at a given location). Certain elements of a suitable head can be adapted from parts of a commercially available thermal inkjet print head device available from Hewlett-Packard Co. as part no. HP51645A. However, other head configurations can be used as desired.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

Figure 3:
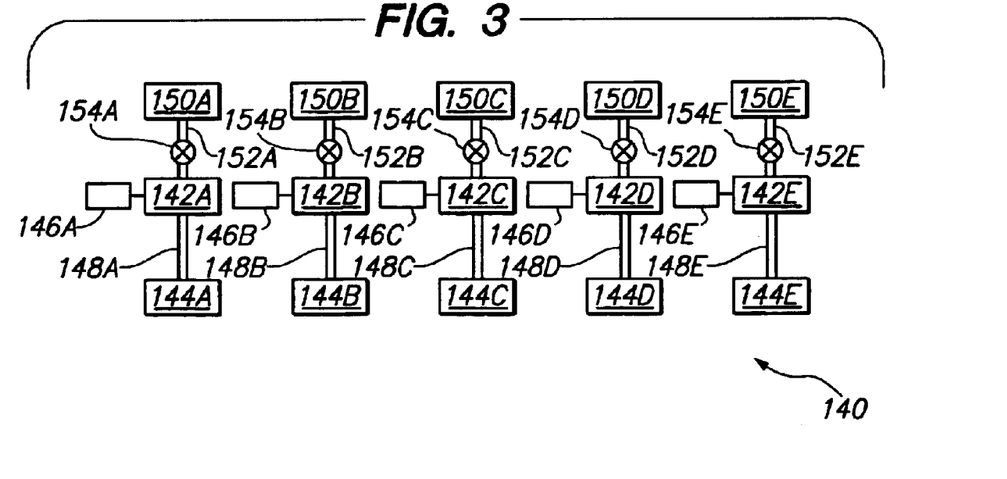
FIG. 3 is a diagrammatic sketch of an embodiment of a fluid dispensing apparatus comprising a device of the present invention.

An example of a fluid dispensing apparatus in accordance with the present invention is depicted in FIG. 3. Fluid dispensing apparatus 140 comprises reservoirs 142a–142e, droplet dispensing devices 144a–144e and fluid level sensors 146a–146e, each being a device as described above. Each of reservoirs 142a–142e are in fluid communication with a respective droplet dispensing device 144a–144e by means of reagent lines 148a–148e. Each of reservoirs 142a–142e is in fluid communication with a respective source of fluid 150a–150e by means of respective reagent lines 152a–152e and valves 154a–154e. In accordance with the methods and devices of the present invention as described above, fluid level sensors 146a–146e measure the level of fluid in respective reservoirs 142a–142e and communicate electronically with respective valves 154a–154e to add fluid to a reservoir that is determined to have a low fluid level.

Another embodiment of the present invention is an apparatus for synthesizing an array of biopolymers on the surface of a support. The apparatus comprises a plurality of reservoirs for containing reagents for synthesizing the biopolymers, a droplet dispensing device comprising a plurality of droplet dispensers, each in fluid communication with a respective reservoir, a plurality of fluid level sensors, one for each of the reservoirs, wherein each of the fluid level sensors is a device as described above, and a mechanism for moving a substrate with respect to the droplet dispensing device.

Figure 4:
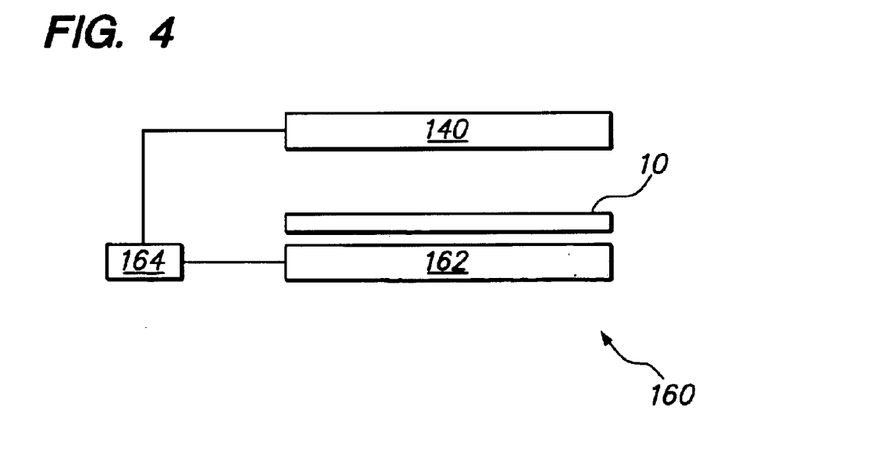
FIG. 4 is a diagrammatic sketch of an embodiment of an apparatus for synthesizing a plurality of biopolymers on the surface of a substrate.

An example of an apparatus for synthesizing a plurality of biopolymers on the surface of a substrate in accordance with the present invention is depicted in FIG. 4. Synthesis apparatus 160 comprises fluid dispensing apparatus 140, movable stage 162 and computer 164, which governs the overall operation of synthesis apparatus 160. Movable stage 162 is shown with substrate 10 in place for dispensing droplets of reagent fluids from fluid dispensing apparatus 140. Substrate 10 may be secured on movable stage 162 by a suitable substrate mount (not shown).

In the above embodiment fluid dispensing apparatus 140 may be adapted for movement along an x-axis independently of the movement of the movable stage 162 along a y-axis. Movement along an x-axis provides for moving fluid dispensing apparatus 140 transversely to the direction of movement of movable stage 162 (along the y-axis) and in position for dispensing of reagents to the surface of substrate 10. In one approach fluid dispensing apparatus 140 may be carried by a stage arrangement, which provides for the desired movement parameters. In this approach the fluid dispensing apparatus 140 is secured to the stage, which may be attached to a frame member of the present apparatus. To achieve the desired level of dispensing accuracy, substrate 10 on movable stage 162 should be oriented parallel to dispensing device on the y-axis.

The components of the synthesis apparatus are normally mounted on a suitable frame. The frame of the apparatus is generally constructed from a suitable material that gives structural strength to the apparatus so that various moving parts may be employed in conjunction with the apparatus. Such materials include, for example, metal, plastic, glass, lightweight composites, and the like.

The aforementioned apparatus and methods may be, and are usually, automated. To this end the apparatus further comprise appropriate motors and electrical and mechanical architecture and electrical connections, wiring and devices such as timers, clocks, computers and so forth for operating the various elements of the apparatus. Such architecture is familiar to those skilled in the art and will not be discussed in more detail herein. As mentioned above, a microcontroller is not required for the functioning of the fluid sensing devices of the invention.

An external supervisory computer may be employed and may be, for example, an IBM® or Apple MacIntosh® compatible personal computer (PC). The external computer is driven by software specific to the methods described herein. A preferred computer hardware capable of assisting in the operation of the methods in accordance with the present invention involves a system with the following specifications: Pentium® processor or better with a clock speed of at least 200 MHz, at least 128 megabytes of random access memory at least 1 gigabyte disk mass storage, at least 10 megabit/sec Ethernet LAN interface, running a suitable operating system, either Windows NT 4.0 or Linux (or successors thereof). Supervisory computer software, that may be used to carry out the methods herein, may use C/C++, Visual BASIC, Visual C++, suitably extended via user-written functions and templates.

It should be understood that the above computer information and the software used herein are by way of example and not limitation. The present methods may be adapted to other embedded and supervisory computers, operating systems and runtime application-specific software.

Another aspect of the present invention is a computer program product comprising a computer readable storage medium having a computer program stored thereon which, when loaded into a computer, performs one of the aforementioned methods.

As indicated above, the present apparatus and methods may be employed in the preparation of substrates having a plurality of chemical compounds in the form of an array on the surface of such substrates. The chemical compounds may be deposited on the surface of the substrate as fully formed moieties. On the other hand, the chemical compounds may be synthesized in situ in a series of steps such as, for example, the addition of building blocks, which are chemical components of the chemical compound. Examples of such building blocks are those found in the synthesis of polymers. The invention has particular application to chemical compounds that are biopolymers such as polynucleotides, for example, oligonucleotides.

Preferred materials for the substrate itself are those that provide physical support for the chemical compounds that are deposited on the surface or synthesized on the surface in situ from subunits. The materials should be of such a composition that they endure the conditions of a deposition process and/or an in situ synthesis of any subsequent treatment or handling or processing that may be encountered in the use of the particular array.

Typically, the substrate material is transparent. By "transparent" is meant that the substrate material permits signal from features on the surface of the substrate to pass therethrough without substantial attenuation and also permits any interrogating radiation to pass therethrough without substantial attenuation. By "without substantial attenuation" may include, for example, without a loss of more than 40% or more preferably without a loss of more than 30%, 20% or 10%, of signal. The interrogating radiation and signal may for example be visible, ultraviolet or infrared light. In certain embodiments, such as for example where production of binding pair arrays for use in research and related applications is desired, the materials from which the substrate may be fabricated should ideally exhibit a low level of non-specific binding during hybridization events.

The materials may be naturally occurring or synthetic or modified naturally occurring. Suitable rigid substrates may include glass, which term is used to include silica, and include, for example, glass such as glass available as Bioglass, and suitable plastics. Should a front array location be used, additional rigid, non-transparent materials may be considered, such as silicon, mirrored surfaces, laminates, ceramics, opaque plastics, such as, for example, polymers such as, e.g., poly (vinyl chloride), polyacrylamide, polyacrylate, polyethylene, polypropylene, poly(4-methylbutene), polystyrene, polymethacrylate, poly (ethylene terephthalate), nylon, poly(vinyl butyrate), etc., either used by themselves or in conjunction with other materials. The surface of the substrate is usually the outer portion of a substrate.

The surface of the material onto which the chemical compounds are deposited or formed may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethylene amines, polyarylene sulfides, polysiloxanes, polyimides, polyacetates, and the like, where the polymers may be hetero- or homo-polymeric, and may or may not have separate functional moieties attached thereto (for example, conjugated). Various further modifications to the particular embodiments described above are, of course, possible. Accordingly, the present invention is not limited to the particular embodiments described in detail above.

The material used for an array support or substrate may take any of a variety of configurations ranging from simple to complex. Usually, the material is relatively planar such as, for example, a slide. In many embodiments, the material is shaped generally as a rectangular solid. As mentioned above, multiple arrays of chemical compounds may be synthesized on a sheet, which is then diced, i.e., cut by breaking along score lines, into single array substrates.

Typically, the substrate has a length in the range about 5 mm to 100 cm, usually about 10 mm to 25 cm, more usually about 10 mm to 15 cm, and a width in the range about 4 mm to 25 cm, usually about 4 mm to 10 cm and more usually about 5 mm to 5 cm. The substrate may have a thickness of less than 1 cm, or even less than 5 mm, 2 mm, 1 mm, or in some embodiments even less than 0.5 mm or 0.2 mm. The thickness of the substrate is about 0.01 mm to 5.0 mm, usually from about 0.1 mm to 2 mm and more usually from about 0.2 to 1 mm. The substrate is usually cut into individual test pieces, which may be the size of a standard size microscope slide, usually about 3 inches in length and 1 inch in width.

The invention has particular application to the preparation of substrates bearing oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "polynucleotide" includes DNA (including cDNA), RNA, oligonucleotides, and PNA and other polynucleotides as described in U.S. Pat. No. 5,948, 902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The nature of the support or substrate to which a plurality of chemical compounds is attached is discussed above. The substrate can be hydrophilic or capable of being rendered hydrophilic or it may be hydrophobic. The substrate is usually glass such as flat glass whose surface has been chemically activated for binding thereto or synthesis thereon, glass available as Bioglass and the like. The surface of a substrate is normally treated to create a primed or functionalized surface, that is, a surface that is able to support the attachment of a fully formed chemical compound or the synthetic steps involved in the production of the chemical compound on the surface of the substrate. Functionalization relates to modification of the surface of a substrate to provide a plurality of functional groups on the substrate surface. By the term "functionalized surface" is meant a substrate surface that has been modified so that a plurality of functional groups are present thereon usually at discrete sites on the surface. The manner of treatment is dependent on the nature of the chemical compound to be synthesized and on the nature of the substrate surface. In one approach a reactive hydrophilic site or reactive hydrophilic group is introduced onto the surface of the substrate. Such hydrophilic moieties can be used as the starting point in a synthetic organic process.

In one embodiment, the surface of the substrate, such as a glass substrate, is siliceous, i.e., the surface comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid substrate having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a substrate will be suggested to those skilled in the art in view of the teaching herein.

The devices and methods of the present invention are particularly useful for the preparation of substrates with array areas with array assemblies of biopolymers. Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, and often known, areas of the surface. Such ordered arrays containing a large number of oligonucleotide probes have been developed as tools for high throughput analyses of genotype and gene expression. Oligonucleotides synthesized on a solid substrate recognize uniquely complementary nucleic acids by hybridization, and arrays can be designed to define specific target sequences, analyze gene expression patterns or identify specific allelic variations. The arrays may be used for conducting cell study, diagnosing disease, identifying gene expression, monitoring drug response, determination of viral load, identifying genetic polymorphisms, analyzing gene expression patterns or identifying specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical compounds or moieties or probe species provide methods of highly parallel detection, and hence improved speed and efficiency, in assays. Assuming that the different sequence polynucleotides were correctly deposited in accordance with the predetermined configuration, then the observed binding is indicative of the presence and/or concentration of one or more polynucleotide components of the sample.

An array includes any one-, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

An array assembly on the surface of a substrate refers to one or more arrays disposed along a surface of an individual substrate and separated by inter-array areas. Normally, the surface of the substrate opposite the surface with the arrays (opposing surface) does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the substrate may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 $cm^2$ or even less than 10 $cm^2$. For example, features may have widths (that is, diameter, for a round spot) in the range from a 10 $\mu$m to 1.0 cm. In other embodiments each feature may have a width in the range of 1.0 $\mu$m to 1.0 mm, usually 5.0 $\mu$m to 500 $\mu$m, and more usually 10 $\mu$m to 200 $\mu$m. Non-round features may have area ranges equivalent to that of circular features with the foregoing width (diameter) ranges.

Any of a variety of geometries of arrays on a substrate may be used. As mentioned above, an individual substrate may contain a single array or multiple arrays. Features of the array may be arranged in rectilinear rows and columns. This is particularly attractive for single arrays on a substrate. When multiple arrays are present, such arrays can be arranged, for example, in a sequence of curvilinear rows across the substrate surface (for instance, a sequence of concentric circles or semi-circles of spots), and the like. Similarly, the pattern of features may be varied from the rectilinear rows and columns of spots to include, for example, a sequence of curvilinear rows across the substrate surface (for example, a sequence of concentric circles or semi-circles of spots), and the like. The configuration of the arrays and their features may be selected according to manufacturing, handling, and use considerations.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. As with the border areas discussed above, these interarray and interfeature areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse-jet. It will be appreciated though, that the interarray areas and interfeature areas, when present, could be of various sizes and configurations.

The devices and methods of the present invention are particularly useful in the preparation of individual substrates with oligonucleotide arrays for determinations of polynucleotides. In one approach, multiple identical arrays across a complete front surface of a single substrate or support are used.

As mentioned above, biopolymer arrays can be fabricated by depositing previously obtained biopolymers (such as from synthesis or natural sources) onto a substrate, or by in situ synthesis methods. The in situ synthesis methods include those described in U.S. Pat. No. 5,449,754 for synthesizing peptide arrays, as well as WO 98/41531 and the references cited therein for synthesizing polynucleotides (specifically, DNA). Such in situ synthesis methods can be basically regarded as repeating at each spot the sequence of: (a) deprotecting any previously deposited monomer so that it can now link with a subsequently deposited protected monomer; and (b) depositing a droplet of another protected monomer for linking where the protected monomers are in a suitable solvent to form fluid reagents. Different monomers may be deposited at different regions on the substrate during any one iteration so that the different regions of the completed array will have different desired biopolymer sequences. One or more intermediate further steps may be required in each iteration, such as oxidation, capping and washing steps. The deposition methods basically involve depositing biopolymers at predetermined locations on a substrate, which are suitably activated such that the biopolymers can link thereto. Biopolymers of different sequence may be deposited at different regions of the substrate to yield the completed array. Washing or other additional steps may also be used. Reagents used in typical in situ synthesis are water sensitive, and thus the presence of moisture should be eliminated or at least minimized.

The in situ method for fabricating a polynucleotide array typically follows, at each of the multiple different addresses at which features are to be formed, the same conventional iterative sequence used in forming polynucleotides from nucleoside reagents on a substrate by means of known chemistry. This iterative sequence is as follows: (a) coupling a selected nucleoside through a phosphite linkage to a functionalized substrate in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized substrate (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, Science 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to produce an array of polynucleotides on the surface of a substrate such as a glass substrate. Such methods are known in the art. One in situ method employs pulse-jet technology to dispense the appropriate phosphoramidite reagents and other reagents, all in the form of fluid reagents, onto individual sites on a surface of a substrate. Oligonucleotides are synthesized on a surface of a substrate in situ using phosphoramidite chemistry. Solutions containing nucleotide monomers and other reagents as necessary such as an activator, e.g., tetrazole, are applied to the surface of a substrate by means of thermal pulse-jet technology. Piezoelectric activated pulse jets may also be used. In any event the pulse-jets used must be constructed of materials chemically compatible with the solutions dispensed. Individual droplets of reagents are applied to reactive areas on the surface using, for example, a thermal pulse-jet type nozzle. The surface of the substrate may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a substrate. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate backside and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

In all of the above methods, fluid reagents are usually contained in reservoirs that are in fluid communication with the droplet dispensers. The fluid level sensing devices of the present invention are employed to monitor and measure the level of fluid reagents in the various reservoirs.

Figure 5:
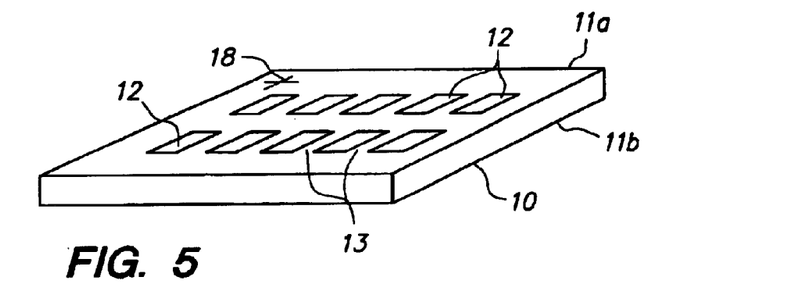
FIG. 5 is a perspective view of a substrate bearing multiple arrays.
Figure 6:
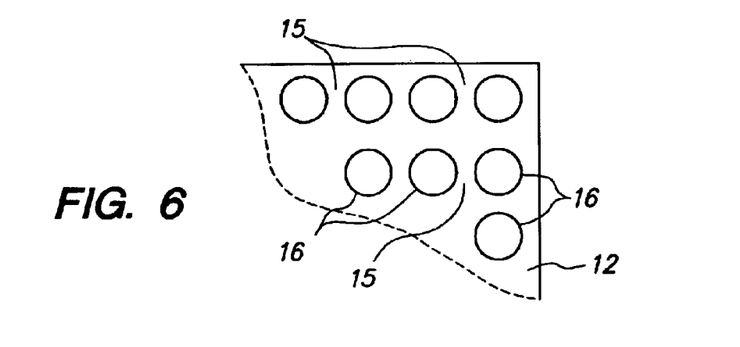
FIG. 6 is an enlarged view of a portion of FIG. 5 showing some of the identifiable individual regions (or "features") of a single array of FIG. 5.
Figure 7:
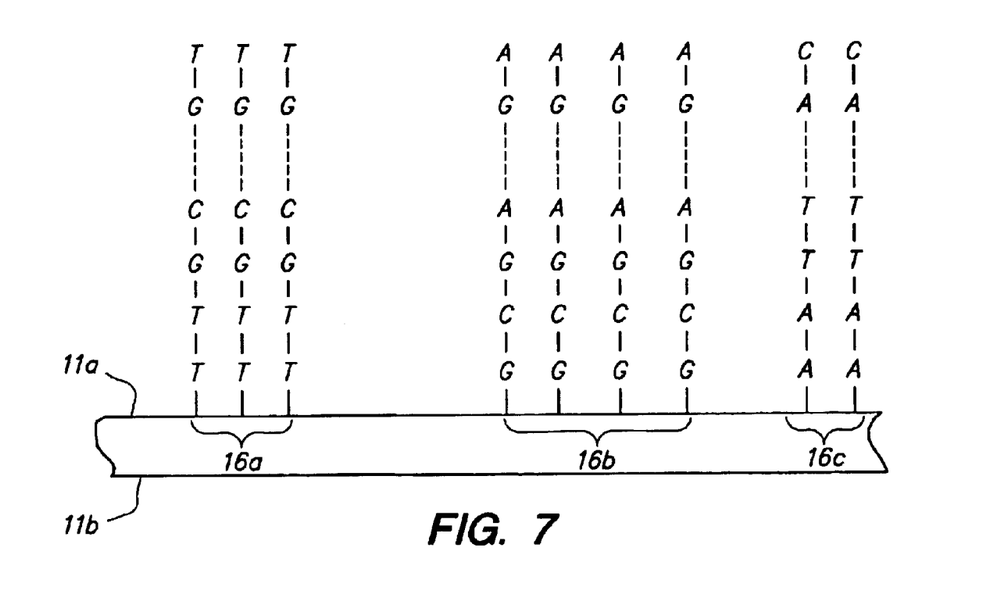
FIG. 7 is an enlarged cross-section of a portion of FIG. 6.

Referring to FIGS. 5–7, there is shown multiple identical arrays 12 (only some of which are shown in FIG. 5), separated by inter-array regions 13, across the complete front surface 11a of a single transparent substrate 10. However, the arrays 12 on a given substrate need not be identical and some or all could be different. Each array 12 will contain multiple spots or features 16 separated by inter-feature regions 15. A typical array 12 may contain from 100 to 100,000 features. At least some, or all, of the features are of different compositions (for example, when any repeats of each feature composition are excluded the remaining features may account for at least 5%, 10%, or 20% of the total number of features). Each feature carries a predetermined moiety (such as a particular polynucleotide sequence), or a predetermined mixture of moieties (such as a mixture of particular polynucleotides). This is illustrated schematically in FIG. 8 where different regions 16 are shown as carrying different polynucleotide sequences.

Substrates comprising polynucleotide arrays may be provided in a number of different formats. In one format, the array is provided as part of a package in which the array itself is disposed on a first side of a glass or other transparent substrate. This substrate is fixed (such as by adhesive) to a housing with the array facing the interior of a chamber formed between the substrate and housing. An inlet and outlet may be provided to introduce and remove sample and wash liquids to and from the chamber during use of the array. The entire package may then be inserted into a laser scanner, and the sample-exposed array may be read through a second side of the substrate.

In another format, the array is present on an unmounted glass or other transparent slide substrate. This array is then exposed to a sample optionally using a temporary housing to form a chamber with the array substrate. The substrate may then be placed in a laser scanner to read the exposed array.

In another format the substrate is mounted on a substrate holder and retained thereon in a mounted position without the array contacting the holder. The holder is then inserted into an array reader and the array read. In one aspect of the above approach, the moieties may be on at least a portion of a rear surface of a transparent substrate, which is opposite a first portion on the front surface. In this format the substrate, when in the mounted position, has the exposed array facing a backer member of the holder without the array contacting the holder. The backer member is preferably has a very low in intrinsic fluorescence or is located far enough from the array to render any such fluorescence insignificant. Optionally, the array may be read through the front side of the substrate. The reading, for example, may include directing a light beam through the substrate from the front side and onto the array on the rear side. A resulting signal is detected from the array, which has passed from the rear side through the substrate and out the substrate front side. The holder may further include front and rear clamp sets, which can be moved apart to receive the substrate between the sets. In this case, the substrate is retained in the mounted position by the clamp sets being urged (such as resiliently, for example by one or more springs) against portions of the front and rear surfaces, respectively. The clamp sets may, for example, be urged against the substrate front and rear surfaces of a mounted substrate at positions adjacent a periphery of that slide. Alternatively, the array may be read on the front side when the substrate is positioned in the holder with the array facing forward (that is, away from the holder).

Regardless of the specific format, the above substrates may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read.

An oligonucleotide probe may be, or may be capable of being, labeled with a reporter group, which generates a signal, or may be, or may be capable of becoming, bound to a support. Detection of signal depends upon the nature of the label or reporter group. Commonly, binding of an oligonucleotide probe to a target polynucleotide sequence is detected by means of a label incorporated into the target. Alternatively, the target polynucleotide sequence may be unlabeled and a second oligonucleotide probe may be labeled. Binding can be detected by separating the bound second oligonucleotide probe or target polynucleotide from the free second oligonucleotide probe or target polynucleotide and detecting the label. In one approach, a sandwich is formed comprised of one oligonucleotide probe, which may be labeled, the target polynucleotide and an oligonucleotide probe that is or can become bound to a surface of a support. Alternatively, binding can be detected by a change in the signal-producing properties of the label upon binding, such as a change in the emission efficiency of a fluorescent or chemiluminescent label. This permits detection to be carried out without a separation step. Finally, binding can be detected by labeling the target polynucleotide, allowing the target polynucleotide to hybridize to a surface-bound oligonucleotide probe, washing away the unbound target polynucleotide and detecting the labeled target polynucleotide that remains. Direct detection of labeled target polynucleotide hybridized to surface-bound oligonucleotide probes is particularly advantageous in the use of ordered arrays.

As mentioned above, in one approach, cell matter is lysed, to release its DNA as fragments, which are then separated out by electrophoresis or other means, and then tagged with a fluorescent or other label. The DNA mix is exposed to an array of oligonucleotide probes, whereupon selective attachment to matching probe sites takes place. The array is then washed and the result of exposure to the array is determined. In this particular example, the array is imaged by scanning the surface of the support so as to reveal for analysis and interpretation the sites where attachment occurred.

The signal referred to above may arise from any moiety that may be incorporated into a molecule such as an oligonucleotide probe for the purpose of detection. Often, as discussed above, a label is employed, which may be a member of a signal producing system. The label is capable of being detected directly or indirectly. In general, any reporter molecule that is detectable can be a label. Labels include, for example, (i) reporter molecules that can be detected directly by virtue of generating a signal, (ii) specific binding pair members that may be detected indirectly by subsequent binding to a cognate that contains a reporter molecule, (iii) mass tags detectable by mass spectrometry, (iv) oligonucleotide primers that can provide a template for amplification or ligation and (v) a specific polynucleotide sequence or recognition sequence that can act as a ligand such as for a repressor protein, wherein in the latter two instances the oligonucleotide primer or repressor protein will have, or be capable of having, a reporter molecule and so forth. The reporter molecule can be a catalyst, such as an enzyme, a polynucleotide coding for a catalyst, promoter, dye, fluorescent molecule, chemiluminescent molecule, coenzyme, enzyme substrate, radioactive group, a small organic molecule, amplifiable polynucleotide sequence, a particle such as latex or carbon particle, metal sol, crystallite, liposome, cell, etc., which may or may not be further labeled with a dye, catalyst or other detectable group, a mass tag that alters the weight of the molecule to which it is conjugated for mass spectrometry purposes, and the like.

The signal may be produced by a signal producing system, which is a system that generates a signal that relates to the presence or amount of a target polynucleotide in a medium. The signal producing system may have one or more components, at least one component being the label. The signal producing system includes all of the reagents required to produce a measurable signal. The signal producing system provides a signal detectable by external means, by use of electromagnetic radiation, desirably by visual examination. Signal-producing systems that may be employed in the present invention are those described more fully in U.S. Pat. Nos. 6,558,908, 6,251,588, 6,235,483 and 6,132,997, the relevant disclosures of which are incorporated herein by reference.

The arrays and the liquid samples are maintained in contact for a period of time sufficient for the desired chemical reaction to occur. The conditions for a reaction, such as, for example, period of time of contact, temperature, pH, salt concentration and so forth, are dependent on the nature of the chemical reaction, the nature of the chemical reactants including the liquid samples, and the like. The conditions for binding of members of specific binding pairs are generally well known and will not be discussed in detail here. The conditions for the various processing steps are also known in the art.

The substrates comprising the arrays prepared as described above are particularly suitable for conducting hybridization reactions. Such reactions are carried out on a substrate or support comprising a plurality of features relating to the hybridization reactions. The substrate is exposed to liquid samples and to other reagents for carrying out the hybridization reactions. The support surface exposed to the sample is incubated under conditions suitable for hybridization reactions to occur.

After the appropriate period of time of contact between the liquid samples and the arrays on the surface of the substrate, the contact is discontinued and various processing steps are performed. Following the processing of the substrate, it is moved to an examining device where the surface of the substrate on which the arrays are disposed is interrogated. The examining device may be a scanning device involving an optical system.

Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent applications: Ser. No. 09/846,125 "Reading Multi-Featured Arrays" by Dorsel, et al.; and U.S. Pat. No. 6,406,849. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. Nos. 6,221,583 and 6,251,685, and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A device for sensing the level of a fluid in a reservoir, said device comprising:
    (a) means for applying a first electric potential of predetermined value to said fluid within said reservoir for a predetermined duration,
    (b) means for measuring the effect of said fluid on said first electric potential, and
    (c) means for applying to said fluid a second electric potential after step (b) for a period of time substantially equivalent to the predetermined duration of step (a) and at a value substantially equivalent to and opposite to the predetermined value of said first electric potential.

2. A device according to claim 1 wherein said means of (a) and (c) comprise a switching circuit.

3. A device according to claim 2 wherein said means of (a) and (c) comprise a ground generator.

4. A device according to claim 1 wherein said means of (b) comprises a sense circuit.

5. A device according to claim 1 wherein said means of (b) comprises an electrode for placing in said reservoir.

6. A device according to claim 1 further comprising a latch circuit.

7. A method for sensing the level of a fluid in a reservoir, said method employing the device of claim 1 and comprising:
    (a) applying a first electric potential to an electrode within said reservoir, said first electric potential having a predetermined value and duration,
    (b) measuring resistance of said fluid within said reservoir during application of said first electric potential, and
    (c) applying a second electric potential to said electrode after said measurement for a period of time substantially equivalent to the duration of said first electric potential and of a value substantially equivalent to and opposite to the predetermined value of said first electric potential.

8. An apparatus for synthesizing an array of biopolymers on the surface of a support, said apparatus comprising:
    (a) a plurality of reservoirs for containing reagents for synthesizing said biopolymers,
    (b) a droplet dispensing device comprising a plurality of droplet dispensers, each in fluid communication with a respective reservoir,
    (c) a plurality of fluid level sensors, one for each of said reservoirs, wherein each of said fluid level sensors is a device according to claim 1, and
    (d) a mechanism for moving a substrate with respect to said droplet dispensing device.

9. A fluid dispensing apparatus comprising:
    (a) a plurality of reservoirs,
    (b) a droplet dispensing device comprising a plurality of droplet dispensers, each in fluid communication with a respective reservoir,
    (c) a plurality of fluid level sensors, one for each of said reservoirs, wherein each of said fluid level sensors is a device according to claim 1.

10. A fluid dispensing apparatus comprising:
    (a) a plurality of reservoirs,
    (b) a droplet dispensing device comprising a plurality of droplet dispensers, each in fluid communication with a respective reservoir,
    (c) a plurality of fluid level sensors, one for each of said reservoirs, wherein each of said fluid level sensors is a device according to claim 2.

11. A fluid dispensing apparatus comprising:
    (a) a plurality of reservoirs,
    (b) a droplet dispensing device comprising a plurality of droplet dispensers, each in fluid communication with a respective reservoir,
    (c) a plurality of fluid level sensors, one for each of said reservoirs, wherein each of said fluid level sensors is a device according to claim 3.

* * * * *